United States Patent [19]

Koski et al.

[11] Patent Number: 4,943,773
[45] Date of Patent: * Jul. 24, 1990

[54] MAGNETOSTRICTIVE LINEAR DISPLACEMENT TRANSDUCER HAVING PRESELECTED ZERO CROSSING DETECTOR

[75] Inventors: Richard D. Koski; William C. Kosco, both of Troy; Arthur Dumais, Rochester, all of Mich.

[73] Assignee: MagneTek Controls, Clawson, Mich.

[*] Notice: The portion of the term of this patent subsequent to Jun. 13, 2006 has been disclaimed.

[21] Appl. No.: 332,771

[22] Filed: Apr. 3, 1989

Related U.S. Application Data

[63] Continuation of Ser. No. 100,535, Sep. 24, 1987, Pat. No. 4,839,590.

[51] Int. Cl.$^5$ .................... G01B 7/14; G01F 23/30
[52] U.S. Cl. .................... 324/207.13; 324/207.24; 324/209; 333/148; 73/290 V; 73/314; 73/453
[58] Field of Search .................... 324/207–209, 324/244, 260; 333/148; 73/305–308, 313, 314, 447, 453, 778, 290 V

[56] References Cited

U.S. PATENT DOCUMENTS

| | | | |
|---|---|---|---|
| 2,334,593 | 11/1943 | Wyckoff | 324/244 |
| 2,474,693 | 6/1949 | Rowe | 324/244 |
| 3,225,312 | 12/1965 | Tellerman | 333/148 X |
| 3,286,190 | 11/1966 | Hare | 333/148 |
| 3,290,649 | 12/1966 | Whitehouse | 333/148 X |
| 3,492,667 | 1/1970 | Gratian | 333/148 X |
| 3,898,555 | 8/1975 | Tellerman | 324/208 |
| 4,305,283 | 12/1981 | Redding | 324/208 X |
| 4,510,587 | 4/1985 | Schneider | 324/208 X |
| 4,678,993 | 7/1987 | Vinnemann et al. | 324/207 |
| 4,709,210 | 11/1987 | Pond | 324/207 |

*Primary Examiner*—Gerard R. Strecker
*Assistant Examiner*—Warren S. Edmonds
*Attorney, Agent, or Firm*—Krass & Young

[57] ABSTRACT

A liquid level detector of the type in which a magnetostrictive wire extends through the liquid level measurement range and is captured in a tensioned vertical orientation within a stainless steel tube. Liquid level is measured as a function of the time required for a torsional disturbance imparted the wire near the top to travel along the wire to a magnet which is contained within a liquid level float which slides up and down along the tube. The torsional disturbances imparted to the wire by means of a piezoelectric crystal to which the wire is easily clamped. Accuracy is enhanced by measuring liquid level as a function of the elapsed time between an actuation signal and the first zero crossing of the voltage which is induced as the torsional strain passes through the area of influence of the sliding magnet.

4 Claims, 2 Drawing Sheets

MAGNETOSTRICTIVE LINEAR DISPLACEMENT TRANSDUCER HAVING PRESELECTED ZERO CROSSING DETECTOR

This is a continuation of co-pending application Ser. No. 07/100,535, filed Sept. 24, 1987, now U.S. Pat. No. 4,839,590.

INTRODUCTION

This invention relates to linear position transducers of the type comprising a linear magnetostrictive wire into which a signal is induced by the propagation of a torsional strain along the wire and through the area of influence of a magnet which is displaceable along the wire. Such transducers are utilized, for example, as liquid level detectors and machine tool position detectors.

BACKGROUND OF THE INVENTION

The usefulness of the phenomenon of magnetostrictivity in linear distance or position measuring devices is recognized by the prior art; for example, see Krisst 4,071,818; Chamuel 4,144,559; Ueda et al. 4,238,844; Bailey et al., 3,423,673 and Tellerman 3,898,555. Common to several devices are a magnetostrictive wire which runs in a straight line path through the measurement field, means for inducing a torsional strain at a given position along the wire, and a magnet which is displaceable along the wire, either by connection to a movable body such as a machine tool or by reason of association with a float device. Generally speaking, the position of the magnet represents the position of the monitored quantity and is determined as a function of the time required for a torsional disturbance to propagate from one end of the wire through the area of influence of the magnet.

At least two problems have been encountered by prior art devices of the class described immediately above. The first arises out of the physical make-up of the components by which the torsional disturbance is created; i.e., these devices typically require a welded connection between the wire and the actuator and are fragile in nature and easily broken. The other problem arises out of the fact that the arrival of the torsional disturbance at the location of influence of the magnet creates a voltage having the characteristic of a damped sinewave and it is common to sense the sinewave at the point of amplitude coincidence with a "trip voltage." However the time required for the induced voltage to rise to the trip voltage can vary with a number of factors including temperature and the intensity of the torsional disturbance. Therefore, the sense point may vary considerably in time and this variance may have a considerable effect on the accuracy of a measurement device and the suitability of the measurement device to applications having a very high accuracy and resolution requirement.

SUMMARY OF THE INVENTION

The present invention provide advantages in the construction, operation and accuracy of linear position measurement devices utilizing magnetostrictive wires and the phenomenon of torsional disturbance propagation speed to determine position, liquid level, and the like. Although described with reference to a liquid level measurement device in which the position of a magnet which is movable along the magnetostrictive wire is determined by the position of a float, it will be apparent to those skilled in the art that the invention may be utilized in numerous alternative applications.

The objective of the invention is to provide a measurement circuit through which accuracy variations due to induced voltage rise time fluctuations are essentially eliminated. In general this is achieved through the use of a circuit for detecting the occurrence of a zero crossing in the induced voltage which zero crossing follows an actuation signal by a fixed time interval set by the physical characteristics of the wire and which is not subject to significant variations due to temperature, signal strength or other parameters in the electronic system which are easily affected by atmospheric conditions.

DETAILED DESCRIPTION OF THE ILLUSTRATIVE EMBODIMENT

Figure 1:
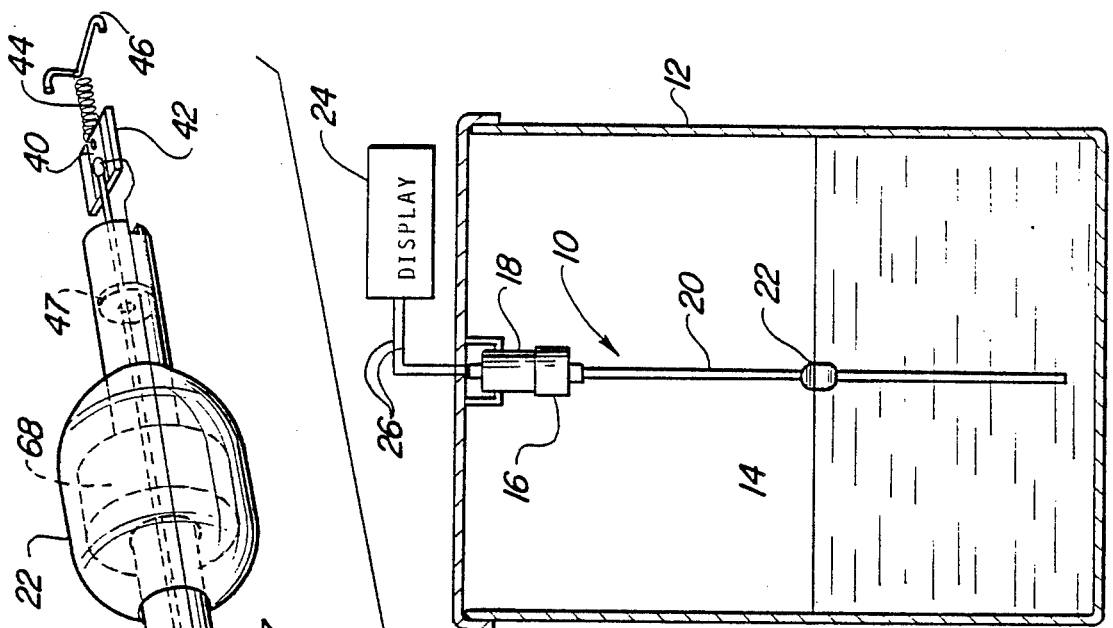
FIG. 1 is a cutaway side view of liquid level detection system embodying the invention.

Referring to FIG. 1 there is shown a liquid level measurement transducer 10 disposed in fixed relationship within a tank 12 for fluid 14 such as gasoline, the level of which may vary from empty to a full condition near the top of the tank 12. In FIG. 1 the tank 12 is slightly less than half full. Transducer comprises a head portion 16 having a fluid tight cap which protects certain electronic components hereinafter described, a stainless steel tube 20 which extends vertically through the tank 12 and through the fluid level measurement field which, in this case, is from a point near the bottom of the tank 12 to a point close to but spaced approximately 8 to 12 inches from the top of the tank 12; i.e., normal maximum fluid level is such that the head 16 and cap 18 are not normally submerged. Mounted on the tube 20 for sliding displacement therealong is a float 22 which contains a circular magnet for purposes hereinafter described. The signal processing electronic components in head 16 are connected to a suitable display 24 by means of low voltage wires 26. Display 24 may be a simple gage or a more sophisticated data processing system having inventory control programming, periodic report printouts and so forth.

Figure 2:
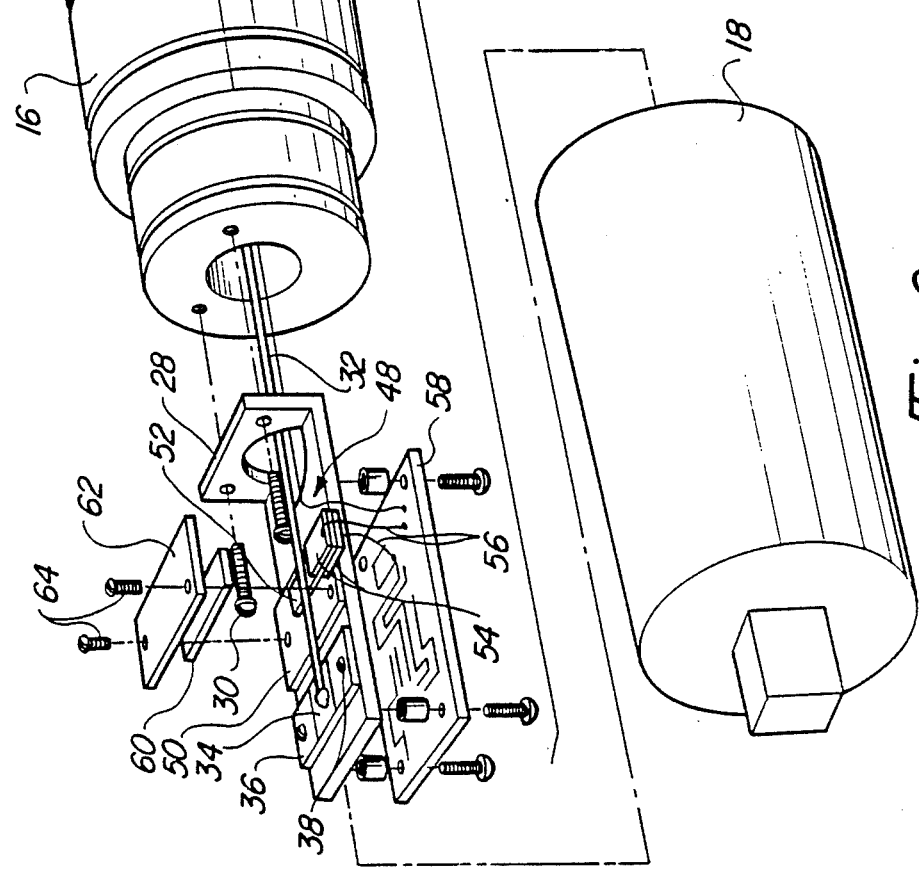
FIG. 2 is a exploded view in perspective of a liquid level transducer embodying the invention.

Referring now to FIG. 2, details of the mechanical and electromechanical components are disclosed. Head 16 is shown with the cap 18 removed. L-shaped steel base plate 28 is connected by screws 30 to the head 16 in a centered position to accommodate certain electronic components hereinafter described and also structure for the mounting of a magnetostrictive wire 32 of nickel/iron alloy; a material known as Nispan C is suitable. Wire 32 runs straight through the center of the tube 20 and is secured at the head end by solder to a copper plated surface 34 on an insulative phenolic plastic pad 36 which is secured by screws 38 to the base plate 28. Wire 32 extends through a hole in the base plate and through the hollow center of the head 16 and, as previously mentioned, through the center of the tube 20 along substantially the entire length thereof. At the foot end wire 32 is secured by solder to a copper plated portion 40 of an insulative phenolic plastic board or plate 42 which, in turn, is secured by means of a tension spring 44 and a yoke 46 to the foot end of the tube 20. Wire 32 is held in spaced relationship relative to the interior walls of the tube 20 by means of rubber spacers 47 which may occur at regular or irregular intervals along the entire length of tube 20. There is essentially no limit on the length of the tube 20; i.e., transducers of 40 feet in length are just as feasible as those of only a few feet in length. Spring 44 ensures proper tension in the wire so that it runs straight and parallel through the tube 20 and yoke 46 is preferably arranged so as to eliminate any tendency of the board 42 to twist.

An actuator 48 is provided to impart a torsional strain to the wire 32 near the head end on command or at regular timing intervals as hereinafter described. The actuator 48 comprises a piezoelectric material having silver plating 54 on a portion of both sides, leaving unplated and exposed an end portion which provides a seat for the wire 32 and which rests on a silicone rubber pad 50 mounted by screws 64 and metal clamp plate 62 to a surface of base plate 28. The silver plating 54 allows actuation signal wires 56 to be electrically connected to opposite faces of the piezoelectric crystal 52 for actuation purposes as hereinafter described in greater detail.

A second silicone rubber pad 60 is placed on top of the wire 32 after it is seated on the exposed, non-conductive portion of the piezoelectric crystal 52 and a metal clamp plate 62 is held in place by screws 64 to clamp the wire 32 down onto the piezoelectrical actuator crystal.

When a voltage is applied across the crystal 52 by means of the wires 56, the crystal expands longitudinally; i.e., in the direction which is transverse to the wire 32. In combination with the clamp effect produced by components 60, 62 and 64, the expansion of the crystal 52 acts like a rack and pinion arrangement to roll the wire 32 and impart a localized torsional strain to the wire which thereafter propagates along the wire 32 from the head end toward the foot end for purposes to be described.

Completing the description of the principal mechanical components shown in FIG. 2 the foot end of wire 32 is electrically connected to a fine copper signal return wire 66 which passes in parallel spaced relationship to the magnetostrictive wire 32 and through offset holes in the spacers 47. The signal return wire 66 is connected to a circuit board 58 which is carried by the base plate 28 on the face opposite the actuator 48. The circuit board 58 is shown only in representative form in FIG. 2 and the electronic components thereof may be arranged according to the preferences of the designer. Principal electronic components are hereinafter described with reference to FIGS. 3 and 4.

Finally, a circular magnet 68 having radially arranged north and south poles is shown slidably disposed around the tube 20 so that it may move along the length of the tube over the measurement range. The magnet 68, in the case of a liquid level detector, is contained within the fluid tight float 22 as shown in FIG. 1. Alternatively the magnet 68 may be attached to a machine tool or other mechanical components the position of which over a predetermined range is to be monitored.

As hereinafter described in greater detail with reference to FIGS. 3 and 4 the operation of the liquid level detector involves the impartation of a torsional strain to the wire 32 by actuator 48. This localized torsional strain propagates along the wire 32 toward the foot end at a known and predetermined rate; typical propagation times for devices used for liquid level detection is about 9 microseconds per inch. As the torsional disturbance passes through the area of influence of the magnet 68, it induces a voltage having the waveform of a damped sinewave in the wire 32. This voltage travels at the speed of light through the wire 32 and through the signal return wire 66 to the circuit board 58 where it is processed to determine elapsed time between the actuation pulse and the induction of the signal pulse at the magnet 68. The length of this interval is a function of the position of the magnet 68 which, in the illustrated case, is a function of liquid level. In the orientation shown in FIG. 1, higher liquid levels result in shorter timing intervals and lower liquid levels result in longer timing intervals. It is a relatively simple matter to convert a timing interval represented by an electronic pulse into an analog signal quantity representing the calibrated position of the magnet 68 along the tube 20. The position of the magnet 68, in turn, represents liquid levels or some other monitored quantity.

Figure 3:
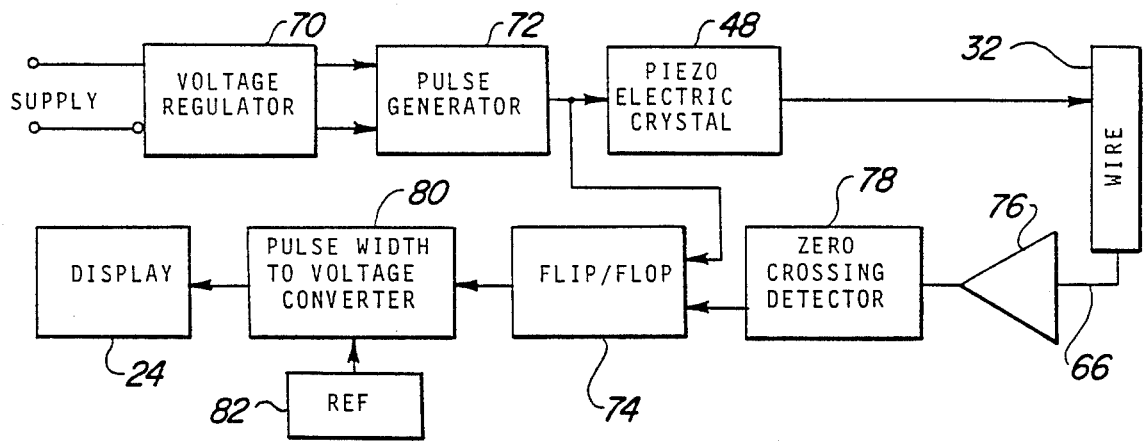
FIG. 3 is a block diagram of a circuit embodying an aspect of the invention.

Referring now to FIG. 3 a block diagram of the preferred electronic system will be described. A DC supply voltage is connected to a conventional voltage regulator 70 which provides fairly carefully regulated voltages to a pulse generator 72. The pulse generator 72 may be actuated by a clock signal or upon demand as suits the system designer to produce a pulse which is applied to the piezoelectric crystal actuator 48 to impart a torsional strain to the wire 32. The output of pulse generator 72 is also connected to the first input of a bistable device such as a flip/flop 74 to mark the beginning of a measured timing interval. The induced pulse from the wire 32 is connected by means of a return wire 66 to an amplifier 76 which increases the signal strength of the induced signal voltage and applies it to a zero crossing detector 78 the purpose of which is to eliminate certain errors hereinafter described. The output of the zero crossing detector 78 is a single pulse which is connected to the reset input of the flip/flop 74 to terminate the timing interval. A pulse having a width equal to the timing signal interval; i.e., equal to the time interval between the occurrence of the actuation pulse form pulse generator 72 and the occurrence of the first zero crossing of the induced voltage from the wire 32, is applied to a pulse width to voltage converter 80. The device 80 may take several forms including the form of a high frequency digital pulse counter whereby the number of accumulated pulses during the timing interval is representative of liquid level. Alternatively the device 80 may comprise a ramp voltage generator receiving a closely controlled voltage from reference source 82 and appropriate sample-and-hold circuitry for determining the amplitude that the ramp voltage achieves during the timing interval. In any event the output of the converter 80 is connected to the remote display 24 which, as previously described, may vary in sophistication over a wide range.

Figure 4:
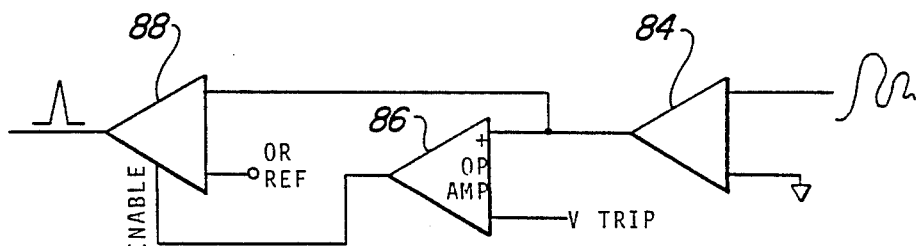
FIG. 4 is a schematic circuit diagram of a portion of the circuit of FIG. 3.

Referring to FIG. 4 details of a suitable zero crossing detector are shown. The damped sinewave voltage which is induced by the torsional disturbance is applied to one input of an amplifier 84 and a reference voltage is applied to the other input. The output of the amplifier is connected to one input of an operational amplifier 86 which functions as a comparator. The opposite input of the amplifier 86 is connected to receive the trip voltage which is preferably set within the voltage amplitude range which is expected in the induced signal voltage; i.e., high enough to avoid the generation of a spurious output signal from amplifier 86. However, instead of relying upon the induced signal reaching the trip voltage as an indication of the end of the timing interval, the output of the operational amplifier is simply connected as an "enable" signal to another amplifier 88 which also receives at its plus and minus inputs the induced signal voltage and a zero reference voltage. Accordingly the output of amplifier 88 goes high when the induced signal voltage from amplifier 84 passes through the first zero crossing after the achievements of the trip voltage. The second zero crossing or even a peak voltage could also be used, the objective of the arrangement of FIG. 4 being to produce a voltage representing the end of the timing signal interval at a point in time which is essentially non-varying and which is a function of the mechanical parameters of the wire 32 and its mounting arrangement rather than the signal voltage strength or rise time. The output of the amplifier 88 is applied to the lower input of flip/flop 74 in FIG. 3 to end the timing interval.

Figure 5:
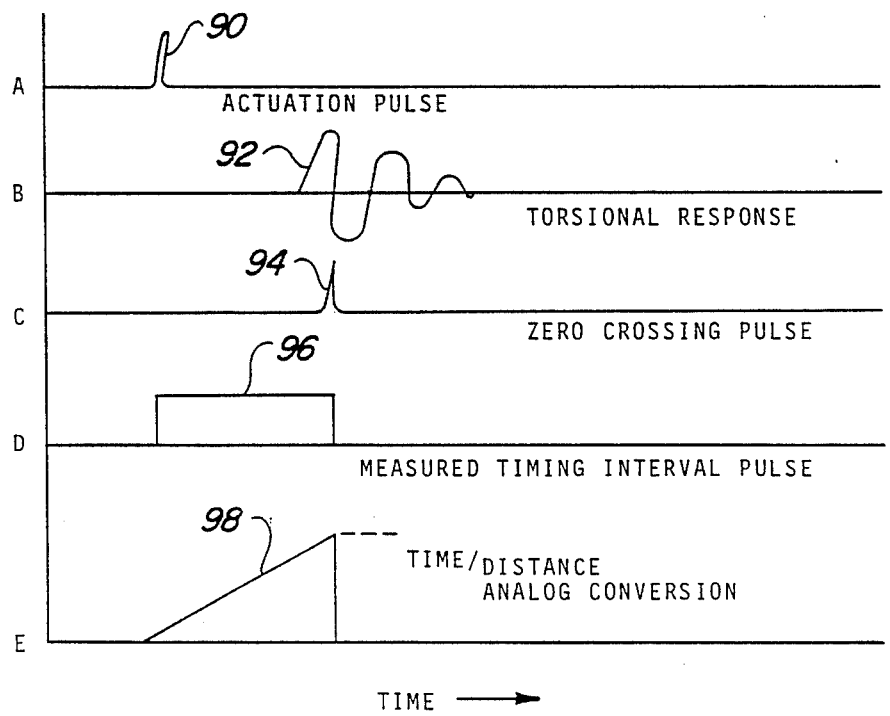
FIG. 5 is a timing chart showing the time relationship between the occurrence of various signals in the circuits of FIGS. 3 and 4.

Referring to FIG. 5 the operation of the device 10 will be briefly described. The actuation pulse 90 occurs at an arbitrarily selected point in time and represents the actuation of the piezoelectric crystal 52 in the actuator 48 to impart the torsional strain to the wire 32. It also represents the application of the set pulse to the upper input of flip/flop 74 in the circuit of FIG. 3. When the torsional disturbance propagates through the field of the magnet 68 a damped sinewave voltage 92 occurs, corresponding to the damped torsional oscillations of wire 32 imparted by actuator 48. At the first zero crossing of the voltage 92 a signal pulse 94 is produced by the zero crossing detector 78. Flip/flop 74 generates a pulse 96 the width of which is exactly equal to the time interval between the occurrence of the pulse 90 and the pulse 94. The device 80 converts the width of pulse 96 to an analog signal voltage by means of a ramp voltage 98 which increases in amplitude at a known rate during the interval represented by the width of pulse 96. This analog quantity of the inverse thereof is applied to the display 24 to indicate liquid level.

Using the construction of the device described herein there is no necessity for welding to secure the actuator 48 to the wire 32 as is required in prior art devices. This greatly facilitates assembly as well as repair and eliminates a weak area which is believed to be the cause of frequent failures in prior art devices.

The zero crossing detector is extremely effective in eliminating errors due to the effects of temperature, humidity and other factors on electronics in the system. However it is desirable to employ a temperature sensing device such as a thermistor in the tube 20 to assist in compensating the electronics of the device for temperature variations. Such temperature sensing devices are also frequently used to compensate volumetric calculators in fluid dispensing systems for the effect of temperature on fluid volume.

We claim:

1. In a position transducer having a housing, a magnetostrictive wire disposed within the housing and mechanically anchored at opposite head and foot ends to define a position measurement range therebetween, a pulse generator for generating an actuation signal, an actuator connected to said pulse generator for imparting a torsional strain to the head end of the wire in response to said actuation signal, and a magnet disposed slidably mounted on the housing for linear displacement along said wire within said position measurement range thereby to produce an induced voltage in the wire upon the arrival of said torsional strain by propagation along said wire at the position of said magnet, the improvement comprising:

a circuit for producing a signal which is time positioned relative to the application of said actuation signal to the actuator according to the linear position of the magnet along the wire, said circuit including means responsive to said actuation signal to initiate a position measurement interval, and means responsive to said induced voltage to terminate the interval upon a preselected zero crossing of said induced voltage.

2. Apparatus as defined in claim 1 wherein the housing comprises a tubular portion, means holding said wire in a tensioned state within and in spaced relationship to said tubular portion.

3. Apparatus as defined in claim 2 further including a float mounted on said tubular portion for sliding displacement therealong, said magnet being carried by said float.

4. Apparatus as defined in claim 1, wherein said means responsive to said induced voltage includes:

a first comparator having a first input connected to receive said induced voltage and a second input connected to a predetermined trip voltage for generating an output signal when said induced voltage exceeds said trip voltage; and a second comparator having a first input connected to receive said induced voltage, a second input connected to a zero reference voltage and an enable input connected to the output of said first comparator, for producing an output signal to terminate said measurement interval upon the first zero crossing of said induced voltage after said enable input receives said output signal from said first comparator.

* * * * *

UNITED STATES PATENT AND TRADEMARK OFFICE
CERTIFICATE OF CORRECTION

PATENT NO. : 4,943,773

DATED : July 24, 1990

INVENTOR(S) : Richard D. Koski et al.

It is certified that error appears in the above-identified patent and that said Letters Patent is hereby corrected as shown below:

Column 2, line 37, "Transducer comprises" should be --Transducer 10 comprises--.

Column 2, line 38, "tight cap which" should be --tight cap 18 which--.

Column 2, line 53, "gage" should be -- gauge--.

Column 3, line 20, "actuator 48 comprises a piezoelectric" should be --actuator 48 comprises a small rectangular strip 52 of piezoelectric--.

Signed and Sealed this

Twenty-second Day of October, 1991

Attest:

HARRY F. MANBECK, JR.

*Attesting Officer*  *Commissioner of Patents and Trademarks*